United States Patent
Cummings

[19]

[11] Patent Number: 6,025,699
[45] Date of Patent: Feb. 15, 2000

[54] SELF DISCHARGE OF BATTERIES AT HIGH TEMPERATURES

[75] Inventor: John A. Cummings, Round Rock, Tex.

[73] Assignee: Dell USA, L.P., Round Rock, Tex.

[21] Appl. No.: 08/989,605

[22] Filed: Dec. 12, 1997

[51] Int. Cl.$^7$ ................................................ H02J 7/00
[52] U.S. Cl. .......................................... 320/136; 320/112
[58] Field of Search .................................. 320/150–154, 320/132–136, 112, 113, 128, 127; 429/7, 62, 90–93

[56] References Cited

U.S. PATENT DOCUMENTS

| | | | |
|---|---|---|---|
| 5,362,942 | 11/1994 | Vanderslice, Jr. et al. | 320/128 |
| 5,508,126 | 4/1996 | Braun | 320/150 |
| 5,518,832 | 5/1996 | Fernandez et al. | 429/49 |
| 5,541,489 | 7/1996 | Dunstan | 320/2 |
| 5,565,759 | 10/1996 | Dunstan | 320/48 |
| 5,568,039 | 10/1996 | Fernandez | 320/29 |
| 5,583,415 | 12/1996 | Fernandez et al. | 320/15 |
| 5,600,230 | 2/1997 | Dunstan | 320/48 |
| 5,623,196 | 4/1997 | Fernandez et al. | 320/30 |
| 5,627,453 | 5/1997 | Sheehan et al. | 320/134 |
| 5,631,537 | 5/1997 | Armstrong | 320/15 |
| 5,645,949 | 7/1997 | Young | 429/7 |
| 5,652,502 | 7/1997 | Van Phuoc et al. | 320/134 |
| 5,834,131 | 11/1998 | Lutz et al. | 429/62 |

*Primary Examiner*—Peter S. Wong
*Assistant Examiner*—K. Shin
*Attorney, Agent, or Firm*—Skjerven, Morrill, MacPherson, Franklin & Friel, L.L.P.; Marc R. Ascolese

[57] ABSTRACT

A rechargeable battery pack that includes a temperature monitoring circuit a rechargeable battery, and a discharge circuit, advantageously provides a battery pack which senses when the battery pack is exposed to a harmful temperature and cause the discharge circuit to discharge electricity stored in the battery until the battery's charge level is reduced to a safe level for the particular temperature. The rechargeable battery has a positive terminal and a negative terminal. The discharge circuit is coupled to the rechargeable battery. A controller is coupled to the discharge circuit. The temperature monitoring circuit is coupled to the controller and measures a temperature of the battery, providing a temperature indication to the controller. The controller causes the discharge circuit to discharge electricity from the battery based upon the temperature indication.

26 Claims, 2 Drawing Sheets

SELF DISCHARGE OF BATTERIES AT HIGH TEMPERATURES

RELATED APPLICATIONS

This application relates to the co-pending U.S. patent application Ser. No. 08/989,474, entitled "Self Heating of Batteries at Low Temperatures," by Robert L. McMahan and John A. Cummings, filed the same day as the present application, and incorporated herein by reference.

BACKGROUND OF THE INVENTION

1. Field of the Invention

This invention relates to batteries, particularly rechargeable batteries that have electronics for protecting the batteries.

2. Description of the Related Art

Rechargeable batteries are used in a variety of electronic devices, including portable computers, portable computer peripherals, personal digital assistants (PDAs), cellular phones, and cameras. Because of the wide variety of uses for rechargeable batteries, a number of different rechargeable battery chemistries have been developed, each having certain advantages and disadvantages. Among the most commonly used battery chemistries are: nickel cadmium (NiCad), nickel-metal hydride (NiMH), lithium ion (Li-ion) and lithium-polymer (Li-polymer).

NiCad batteries have nickel and cadmium electrodes and a potassium hydroxide electrolyte. NiCad batteries are the most common rechargeable batteries, however, NiCad batteries are subject to a number of problems. For example, NiCad batteries have a memory effect, which is a loss of battery capacity caused by recharging the battery before it is fully discharged. Additionally, NiCad batteries are susceptible to over-charging, which causes the battery to develop internal short circuits, thereby causing the battery to run down prematurely which may eventually cause the battery to take no charge at all. Additionally, cadmium is a poisonous heavy metal, and so disposing of NiCad batteries presents additional problems.

NiMH batteries offer higher energy density than NiCad batteries, eliminate many of the disposal problems, and are relatively inexpensive. NiMH batteries have a hydrogen-absorbing alloy anode, a nickel compound cathode, and a potassium hydroxide electrolyte. However, NiMH batteries also have a number of disadvantages. For example, NiMH batteries have a high self-discharge rate, are subject to voltage depression (an effect similar to the memory effect seen in NiCad batteries), and are sensitive to thermal conditions.

In recent years, Li-ion batteries have become the rechargeable battery of choice in devices such as portable computers. The chemistry behind Li-ion batteries involves lithium-plated foil anodes, an organic electrolyte, and lithium compounds within carbon electrodes. Li-ion batteries have very high energy densities, better cycle life than NiMH or NiCad batteries, higher output voltages, and lower self-discharge rates. However, one problem with Li-ion batteries, and potentially other battery chemistries, is the batteries' vulnerability to damage when charged to high capacity (e.g. 85–100% of full capacity) and exposed to high temperatures (e.g. 55° C. or greater). Under these conditions the battery may suffer permanent degradation in performance or even total failure.

Accordingly, it is desirable to have a rechargeable battery pack that protects a rechargeable battery from performance degradation associated with exposure to harmful temperatures when the battery is charged above a particular capacity.

SUMMARY OF THE INVENTION

It has been discovered that a rechargeable battery pack that includes a temperature monitoring circuit, a rechargeable battery, and a discharge circuit, advantageously provides a battery pack which senses when the battery pack is exposed to a harmful temperature and causes the discharge circuit to discharge electricity stored in the battery until the battery's charge level is reduced to a safe level for the particular temperature.

Accordingly, one aspect of the present invention provides a rechargeable battery pack that includes a rechargeable battery having a positive terminal and a negative terminal. A discharge circuit is coupled to the rechargeable battery. A controller is coupled to the discharge circuit. A temperature monitoring circuit is coupled to the controller. The temperature monitoring circuit is capable of measuring a temperature of the battery and providing a temperature indication to the controller. The controller causes the discharge circuit to discharge the battery based upon the indication.

In another aspect of the invention, a rechargeable battery pack includes a rechargeable battery having a positive terminal and a negative terminal. A discharge circuit is coupled across the positive and the negative terminal of the rechargeable battery. A temperature monitoring circuit is coupled to the discharge circuit, and the temperature monitoring circuit causes the discharge circuit to discharge the battery based upon a temperature measured by the temperature monitoring circuit.

In still another aspect of the invention, a battery powered computer system includes a host device and a rechargeable battery pack coupled to the host device. The battery pack is capable of providing power to the host device. The rechargeable battery pack includes a rechargeable battery having a positive terminal and a negative terminal. A discharge circuit is coupled to the rechargeable battery. A controller is coupled to the discharge circuit. A temperature monitoring circuit is coupled to the controller. The temperature monitoring circuit is capable of measuring a temperature of the battery and providing a temperature indication to the controller. The controller causes the discharge circuit to discharge the battery based upon the indication.

In yet another aspect of the invention, a method of protecting a rechargeable battery is disclosed. A rechargeable battery pack including a rechargeable battery, a temperature monitoring circuit, a discharge circuit, and a controller are provided. A temperature of the rechargeable battery is measured with the temperature monitoring circuit. The measured temperature is compared with a threshold temperature to obtain a comparison result. A battery charge level of the rechargeable battery is also measured. Based upon the comparison result and the measured battery charge level, the rechargeable battery is discharged with the discharge circuit until the battery charge level is below a safe battery charge level.

In another aspect of the invention, an apparatus for protecting a rechargeable battery includes a discharge circuit, a controller, and a temperature monitoring circuit. The discharge circuit is capable of being coupled to a rechargeable battery. The controller is coupled to the discharge unit. The temperature monitoring circuit is coupled to the controller. The temperature monitoring circuit is capable of measuring a temperature of a rechargeable battery and providing a temperature indication to the controller, the controller causing the discharge circuit to discharge the battery based upon the indication.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
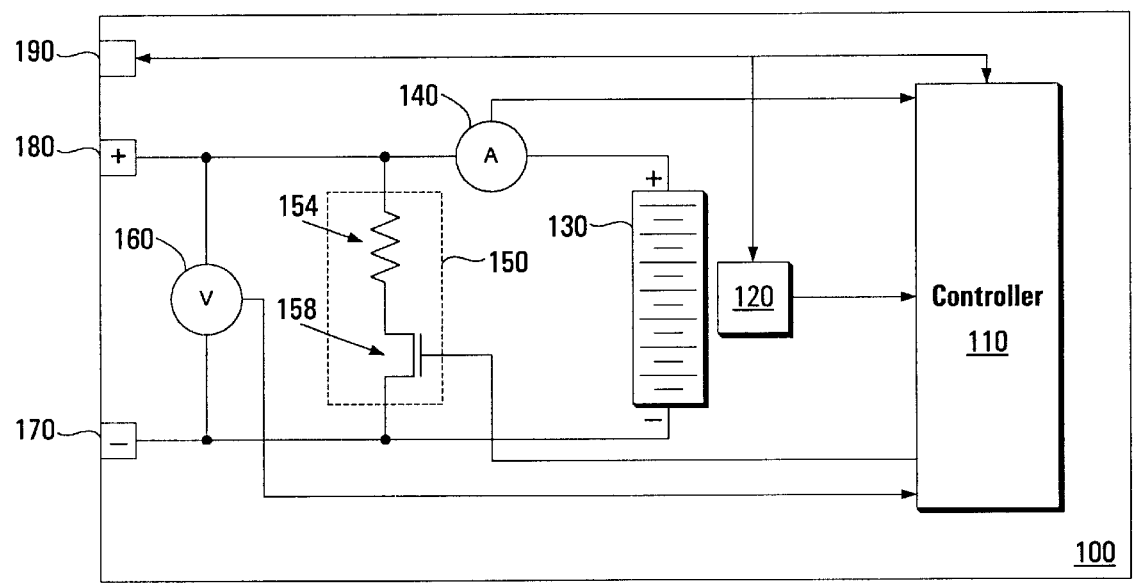
FIG. 1 is a functional block diagram showing a rechargeable battery pack.

Referring to FIG. 1, rechargeable battery pack 100 includes a controller 110, a temperature monitoring circuit 120, a rechargeable battery 130, current measuring circuit 140, discharge circuit 150, and voltage measuring circuit 160. Battery 130 has a positive terminal and a negative terminal, and each is coupled to its respective battery pack terminals 180 and 170. Bus interface 190 is coupled to controller 110 and temperature monitoring circuit 120, allowing communication among those devices and devices external to the battery pack, such as a portable computer (e.g. computer system 310 of FIG. 3). Current is supplied to a load, such is, for example, a portable computer, through battery pack terminals 170 and 180. Current measuring circuit 140 and voltage measuring circuit 160 are each of conventional design. Circuits 140 and 160 provide signals (which may be analog and/or digital) to controller 110 indicative of the instantaneous current and voltage, respectively, supplied or suppliable by the battery to the load.

Temperature monitoring circuit 120 is coupled to controller 110, and measures the temperature of the battery. In one embodiment, temperature monitoring circuit 120 includes a temperature sensor, a comparator, and a bus interface. One example of such a temperature monitoring circuit is available form National Semiconductor Corporation under the trade designation LM75. The temperature sensor, for example a silicon bandgap device, measures the temperature of the battery pack and provides temperature information to both the comparator and the bus interface. The comparator compares the measured temperature to a threshold temperature stored in a memory. Depending upon the result of the comparison, the comparator may alert another device to take further action. For example, if the threshold temperature is 55° C. and the temperature sensor detects that the battery temperature is 56° C., then the comparator provides an over-threshold indication to controller 110. Based on that indication, controller 110 can then take action to protect the battery. Alternatively, temperature monitoring circuit 120 may be a thermistor that provides controller 110 with a signal indicative of the battery temperature. Accordingly, temperature monitoring circuit 110 need not be coupled to bus interface 190. Those of ordinary skill in the art will recognize that a variety of different temperature monitoring circuits can be used in the present invention. Temperature monitoring circuit 120 is shown located in close proximity to battery 130. Although such location is advantageous for more accurately monitoring the battery's temperature, such location is not necessary. For example, if temperature monitoring circuit 120 has sufficient thermal contact with the battery (e.g. via thermal epoxy between the two), proximity to the battery is not required.

Discharge circuit 150 is coupled in parallel with battery 130, and is also coupled to controller 110 for activation. When activated, discharge circuit 150 discharges electricity stored in the battery until the battery's charge level is reduced to a safe level for the particular temperature being experienced by the battery. Discharge circuit 150 need not be coupled in parallel with battery 130, and may, for example, be coupled in series with battery 130 if appropriate switching is coupled in parallel with the discharge circuit. Discharge circuit 150 includes resistor 154 and transistor 158 coupled in series. When the controller determines that the battery requires discharge, the controller signals discharge circuit 150. In this case, controller 110 is coupled to the gate of transistor 158 and the signal to discharge the battery is a voltage applied to the gate of transistor 158, thereby opening the transistor and allowing current to be dissipated by resistor 154. Discharge circuit 150 may be constructed from a variety of different components to achieve battery discharge. For example, discharge circuit 150 may consist solely of a field effect transistor (FET) that possess a variety of different resistances depending upon the voltage applied to the transistor's gate. Thus, such a FET would serve as both a switch and a current dissipating element.

In addition to activating discharge circuit 150 when necessary, controller 110 monitors the battery charge level based upon voltage and current measurements from circuits 160 and 140, and may perform other tasks such as determining the mode in which the battery pack currently operates. For example, a battery pack that is disconnected from a battery powered device, connected to a battery powered device that is turned off, or connected to a battery powered device that is receiving power from another source (e.g. AC power from a wall outlet) may be operating in a sleep mode. Under these conditions, the battery may remain in sleep mode until its current draw increases (e.g. it is used by a device), it sees some activity elsewhere in the system (e.g. communication through bus interface 190), it is awakened by temperature monitoring circuit 120, or some other condition. Alternatively, a battery pack that is in use may be in a wake mode. Consequently, the controller may be required to activate the discharge circuit when the battery pack is in a variety of different modes.

Controller 110 may be a microcontroller, an application specific integrated circuit (ASIC), a microprocessor, and embedded processor, or any suitable control device. Indeed, controller 110 may include some or all of the voltage measuring, current measuring, temperature monitoring, and discharge circuits.

Although only one battery 130 is shown, battery pack 100 may also contain a plurality of batteries in series, in parallel, or in some combination of the two. Moreover, the battery or batteries may be constructed based on NiCad, NiMH, Li-ion, Li-polymer, or any other suitable battery chemistry.

Figure 2:
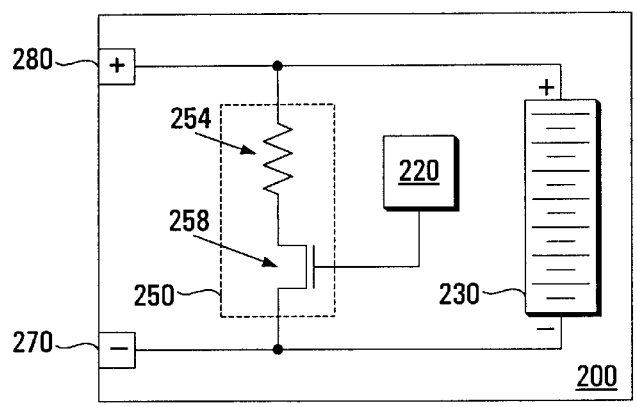
FIG. 2 is a functional block diagram showing another rechargeable battery pack.

FIG. 2 illustrates another example of a rechargeable battery pack. Rechargeable battery pack 200 includes a rechargeable battery 230, a temperature monitoring circuit 220, a discharge circuit 250 and battery pack terminals 270 and 280. Rechargeable battery 220 has a positive terminal and a negative terminal, each coupled to battery pack terminals 280 and 270, respectively. Discharge circuit 250 is wired in parallel with battery 230, and is coupled to temperature monitoring circuit 220 for activation. When activated, discharge circuit 250 discharges electricity stored in the battery until the battery's charge level is reduced to a safe level for the particular temperature being experienced by the battery.

Discharge circuit 250 includes resistor 254 and transistor 258 wired in series. In operation, temperature monitoring circuit 220 measures the battery temperature and compares that temperature to a threshold temperature. Depending on the result of that comparison, temperature monitoring circuit 220 activates discharge circuit 250, thereby discharging the battery until it reaches a safe battery charge level. This can be accomplished by completely discharging the battery, discharging the battery for a predetermined period of time, or using some other discharge scheme.

Figure 3:
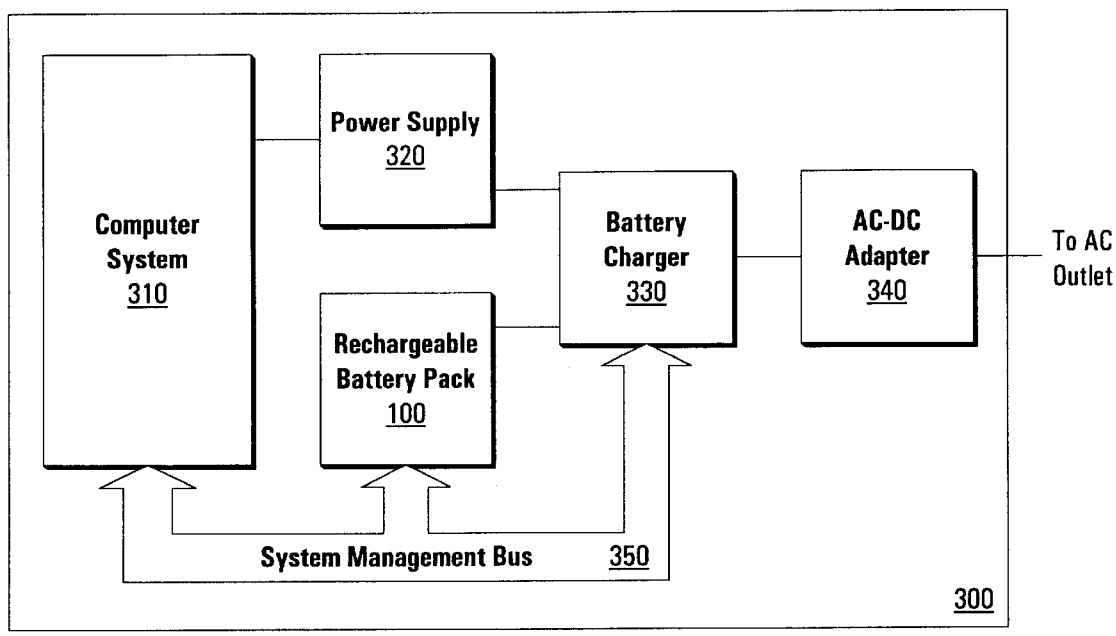
FIG. 3 illustrates a battery powered system.

FIG. 3 illustrates a battery powered system 300 (in this case a portable computer system) that includes computer system 310, power supply 3201, rechargeable battery pack 100, battery charger 330, and AC-DC adapter 340. Computer system 310, rechargeable battery pack 100, and battery charger 330 can communicate among each other over system management bus 350. Computer system 310 includes a processor and memory, as well as other devices necessary for computer system function, such a display screen, a disk drive, or a keyboard. Computer system 310 receives power from power supply 320 which in turn receives power from either rechargeable battery pack 100 or an electrical outlet (not shown) via AC-DC adapter 340. Battery charger 330 may charge rechargeable battery pack 100 if necessary.

Rechargeable battery pack 100 and battery charger 330 are examples of so-called "smart devices" because 100 and 330 can exchange information between themselves or among other devices over the system management bus 350. Such information exchange enhances interoperability among devices. Rechargeable battery pack 100 can provide computer system 310 and battery charger 330 with charging and present charge capacity information. In turn, computer system 310 can report to the user information including remaining battery capacity, remaining operating time, and availability of power for additional, specified loads. The system management bus can also allow computer system 310 to monitor and provide optimal charging of battery pack 100. Additionally, the system management bus may be used to control the power consumption or operating state of various devices.

Figure 4:
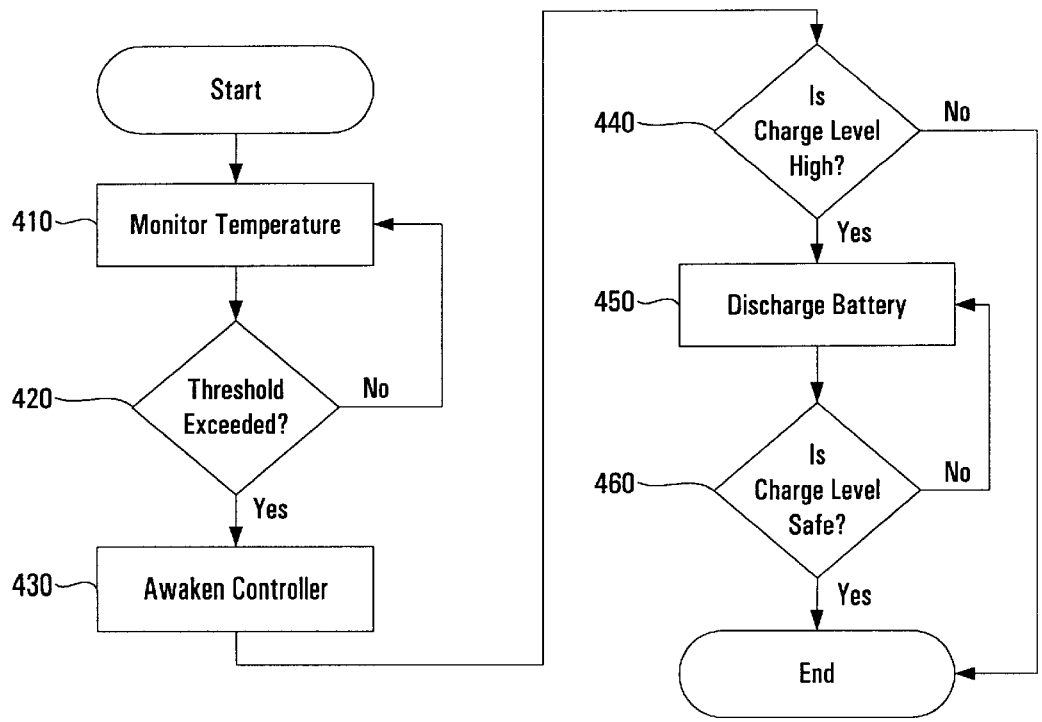
FIG. 4 is a flowchart illustrating a method for protecting a rechargeable battery pack.

FIG. 4 is a flow chart of a method of protecting a rechargeable battery. In monitor temperature step 410, the temperature of a rechargeable battery is determined and control transfers to threshold step 420. Monitoring may be accomplished by a temperature monitoring circuit, a temperature monitoring circuit acting in conjunction with a controller, or some other suitable device. In threshold step 420, the temperature of the battery is compared with a threshold temperature to determine the battery temperature exceeds the threshold temperature. If the battery temperature is below the threshold temperature, then control returns to monitor temperature step 410. If the battery temperature exceeds the threshold temperature, appropriate action should be taken to protect the battery, and control transfers to awaken controller step 430. In awaken controller step 430, a controller is notified to wake up from its sleep mode. The controller may then take a number of different actions. For example, the controller may confirm the battery temperature by polling the temperature monitoring circuit, it may automatically discharge the battery, or (as illustrated in high charge level step 440) the controller may determine if the battery charge level is such that exposure of the battery to the measured temperature threatens the performance of the battery. If control is transferred to high charge level step 440, and the battery charge level is not high (i.e. there is no danger to the battery despite the temperature), then the protection process terminates. At this point, the process can be restarted, or other steps can be taken to ensure that the battery is protected. If the battery charge level is too high for the temperature measured, then control is transferred to discharge step 450 and the battery is discharged. Discharging may occur for a predetermined time, until the battery is completely discharged, until the battery charge level is some other safe charge level, or following some other discharging scheme. When discharge step 450 is complete, control is transferred to safe charge level step 460. Safe charge level step 460 determines if the battery charge level is safe, and if not allows for additional discharging by transferring control to discharge step 450. If the battery charge level is safe, then the process terminates as described above.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A rechargeable battery pack comprising:

a rechargeable battery having a positive terminal and a negative terminal;

a discharge circuit coupled to the rechargeable battery;

a controller coupled to the discharge circuit;

a voltage measuring circuit coupled to the battery, the voltage measuring circuit determining the voltage across the battery and supplying a voltage indication to the controller;

a current measuring circuit coupled to the battery, the current measuring circuit determining the current provided by the battery and supplying a current indication to the controller; and a temperature monitoring circuit coupled to the controller, the temperature monitoring circuit being capable of measuring a temperature of the battery and providing a temperature indication to the controller, the controller using the voltage indication, the current indication, and the temperature indication to determine a battery charge level, and, for a particular temperature, the controller causing the discharge circuit to discharge electricity from the battery until the battery charge level is reduced to a safe battery charge level.

2. The battery pack of claim 1 wherein the discharge circuit is coupled in parallel with the rechargeable battery.

3. The battery pack of claim 1 wherein the discharge circuit includes a resistor and a transistor coupled in series, the transistor being controlled by the controller.

4. The battery pack of claim 1 wherein the discharge circuit includes a variable resistance field effect transistor.

5. A rechargeable battery pack comprising:

a rechargeable battery having a positive terminal and a negative terminal;

a discharge circuit coupled to the rechargeable battery;

a controller coupled to the discharge circuit; and a temperature monitoring circuit coupled to the controller, the temperature monitoring circuit including:

a temperature sensor, the temperature sensor producing an analog temperature signal;

an analog-to-digital converter coupled to the temperature sensor, the converter converting the analog temperature signal to a digital temperature value;

a memory device;

a comparator coupled to the converter and the memory device, the comparator including an output terminal, the comparator providing an output signal on the output terminal based on a comparison of the digital temperature value to a threshold temperature value stored in the memory device; and an interface coupled to the converter and the memory device, the interface allowing communication between the temperature monitoring circuit and the controller:

wherein the temperature monitoring circuit is capable of measuring a temperature of the battery and providing a temperature indication to the controller, the controller causing the discharge circuit to discharge the battery based upon the indication.

6. The battery pack of claim 5 wherein the temperature sensor is a silicon bandgap temperature sensor.

7. The battery pack of claim 1 further comprising a bus interface coupled to the controller.

8. The battery pack of claim 7 wherein the bus interface is a system management bus interface.

9. The battery pack of claim 1 wherein the rechargeable battery uses a battery chemistry selected from nickel cadmium, nickel-metal hydride, lithium ion, and lithium-polymer chemistries.

10. The battery pack of claim 1 wherein the controller is an integrated circuit selected from the group consisting of microcontrollers, microprocessors, application specific integrated circuits (ASICs), and embedded processors.

11. A rechargeable battery pack comprising:

a rechargeable battery having a positive terminal and a negative terminal;

a discharge circuit coupled to the rechargeable battery;

a controller coupled to the discharge circuit; and a temperature monitoring circuit coupled to the controller, the temperature monitoring circuit being capable of measuring a temperature of the battery and providing a plurality of temperature indications to the controller including a temperature warning signal and a temperature value signal, the controller causing the discharge circuit to discharge the battery based upon at least one of the indications.

12. A battery powered computer system comprising:

a host device; and a rechargeable battery pack coupled to the host device, the battery pack capable of providing power to the host device, the battery pack including:

a rechargeable battery having a positive terminal and a negative terminal;

a discharge circuit coupled to the rechargeable battery;

a controller coupled to the discharge circuit;

a voltage measuring circuit coupled to the battery, the voltage measuring circuit determining the voltage across the battery and supplying a voltage indication to the controller;

a current measuring circuit coupled to the battery, the current measuring circuit determining the current provided by the battery and supplying a current indication to the controller; and a temperature monitoring circuit coupled to the controller, the temperature monitoring circuit being capable of measuring a temperature of the battery and providing a temperature indication to the controller, the controller using the voltage indication, the current indication, and the temperature indication to determine a battery charge level, and, for a particular temperature, the controller causing the discharge circuit to discharge electricity from the battery until the battery charge level is reduced to a safe battery charge level.

13. The battery powered computer system of claim 12 wherein the host device includes a processor and a memory coupled to the processor, and wherein the processor and the memory are powered by the rechargeable battery pack.

14. The battery powered computer system of claim 12 wherein the discharge circuit is coupled in parallel with the rechargeable battery.

15. The battery powered computer system of claim 12 wherein the discharge circuit includes a resistor and a transistor coupled in series, the transistor being controlled by the controller.

16. The battery powered computer system of claim 12 further comprising a communications bus, the host device being coupled to the communications bus, the battery pack including a bus interface coupled to the controller and to the communications bus.

17. The battery powered computer system of claim 12 wherein the rechargeable battery uses a battery chemistry selected from nickel cadmium, nickel-metal hydride, lithium ion, and lithium-polymer chemistries.

18. The battery powered computer system of claim 12 wherein the controller is an integrated circuit selected from the group consisting of microcontrollers, microprocessors, application specific integrated circuits (ASICs), and embedded processors.

19. A method of protecting a rechargeable battery comprising:

providing a rechargeable battery pack including a rechargeable battery, a temperature monitoring circuit, a discharge circuit, and a controller;

measuring a temperature of the rechargeable battery with the temperature monitoring circuit;

comparing the measured temperature with a threshold temperature to obtain a comparison result;

measuring a battery charge level of the rechargeable battery; and discharging, based upon the comparison result and the measured battery charge level, the rechargeable battery with the discharge circuit until the battery charge level is reduced to a safe battery charge level.

20. The method of claim 19 wherein the comparing step is performed by the temperature monitoring circuit.

21. The method of claim 19 wherein the comparing step is performed by the controller.

22. The method of claim 19 wherein the rechargeable battery pack includes a voltage monitoring circuit and a current monitoring circuit, the method further comprising:

measuring a voltage of the battery;

measuring a current of the battery; and using the measured temperature, voltage, and current to determine the battery charge level.

23. An apparatus for protecting a rechargeable battery comprising:

a discharge circuit, the discharge circuit capable of being coupled to a rechargeable battery;

a controller coupled to the discharge circuit, the controller being capable of receiving a voltage indication from the of rechargeable battery and a current indication from the rechargeable battery; and a temperature monitoring circuit coupled to the controller, the temperature monitoring circuit being capable of measuring a temperature of a rechargeable battery and providing a temperature indication to the controller, the controller using the voltage indication, the current indication, and the temperature indication to determine a battery charge level, and, for a particular temperature, the controller causing the discharge circuit to discharge electricity from the battery until the battery charge level is reduced to a safe battery charge level.

24. The apparatus of claim 23 wherein the discharge circuit is coupled in parallel with the rechargeable battery.

25. The apparatus of claim 23 wherein the discharge circuit includes a resistor and a transistor coupled in series, the transistor controlled by the controller.

26. The apparatus of claim 23 further comprising a bus interface coupled to the controller.

* * * * *